(12) United States Patent
Johnston

(10) Patent No.: US 8,996,714 B2
(45) Date of Patent: Mar. 31, 2015

(54) STATE-DEPENDENT ENTITY BASED IMPLEMENTATION OF A SERVICE ORIENTED ARCHITECTED APPLICATION

(75) Inventor: Simon K. Johnston, Siler City, NC (US)

(73) Assignee: International Business Machines Corporation, Armonk, NY (US)

( * ) Notice: Subject to any disclaimer, the term of this patent is extended or adjusted under 35 U.S.C. 154(b) by 2688 days.

(21) Appl. No.: 11/465,827

(22) Filed: Aug. 21, 2006

(65) Prior Publication Data

US 2008/0046259 A1 Feb. 21, 2008

(51) Int. Cl.
  *G06F 15/173* (2006.01)
  *G06Q 10/10* (2012.01)
  *H04L 29/08* (2006.01)

(52) U.S. Cl.
  CPC ..................... *H04L 67/16* (2013.01)
  USPC ............. 709/232; 709/223; 345/420; 705/1.1

(58) Field of Classification Search
  USPC ................................ 705/1, 1.1; 709/232, 223
  See application file for complete search history.

(56) References Cited

U.S. PATENT DOCUMENTS

| | | | |
|---|---|---|---|
| 5,251,290 A * | 10/1993 | Pabon | 345/420 |
| 6,546,412 B1 | 4/2003 | Kim et al. | |
| 6,556,659 B1 | 4/2003 | Bowman-Amuah | |
| 6,714,987 B1 | 3/2004 | Amin et al. | |
| 6,748,417 B1 | 6/2004 | Helland | |
| 6,757,720 B1 | 6/2004 | Weschler, Jr. | |
| 7,600,007 B1 * | 10/2009 | Lewis | 709/223 |
| 2005/0050311 A1 * | 3/2005 | Joseph et al. | 713/1 |
| 2005/0223109 A1 * | 10/2005 | Mamou et al. | 709/232 |
| 2007/0033273 A1 * | 2/2007 | White et al. | 709/223 |

OTHER PUBLICATIONS

He et al., Constraints: An International Journal, 3 ,p. 289-314 (1998) Kluver Academic Publishers, Boston. "Constrained Graph Layout".*
Qian, Kai et al; Decoupling Metrics for Services Composition; IEEE, 2006; Proceedings of the 5th IEEE/ACIS Int'l Conference on Computer and Information Science (ICIS-COMSAR'06).
Padadimitriou, Christos H. et al; A Communication-Time Tradeoff; 1984 IEEE.
Wombacher, Andreas; Decentralized Consistency Checking in Cross-organizational Workflows; Proceedings of the 8th IEEE Int'l Conference on E-Commerce Technology and t he 3rd IEEE Int'l Conference on Enterprise Computing (CEC/EEE'06).

* cited by examiner

*Primary Examiner* — Lynda Jasmin
*Assistant Examiner* — Kimberly Evans
(74) *Attorney, Agent, or Firm* — Steven M. Greenberg, Esq.; CRGO Law

(57) ABSTRACT

Embodiments of the present invention address deficiencies of the art in respect to data granularity for an SOA and provide a method, system and computer program product for implementing an SOA using state-dependent entities. In an embodiment of the invention, a method for varying data granularity of a service component in an SOA according to state dependent entities can be provided. The method can include managing different states for a service component responsive to different operations performed in the service component; constraining an entity graph for the service component according to a first state of the service component; and, re-constraining the entity graph to include different properties for a second state of the service component.

14 Claims, 3 Drawing Sheets

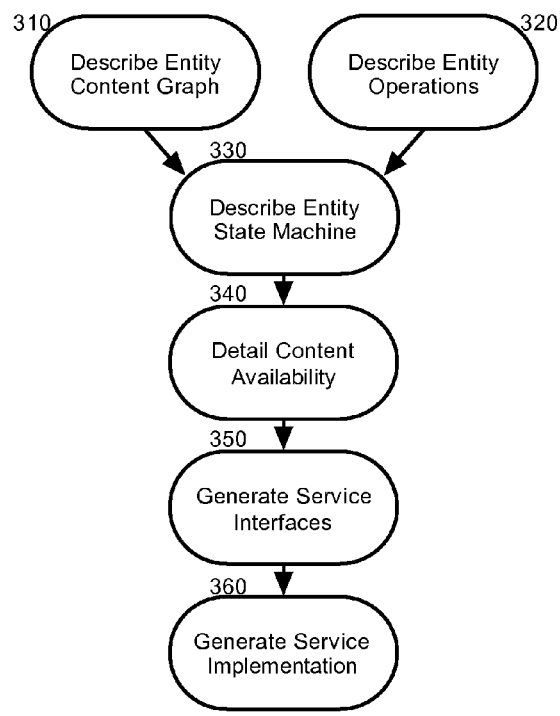
FIG. 3
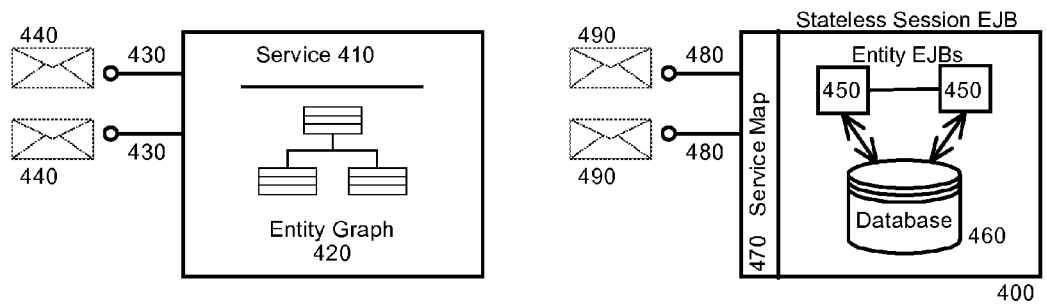
FIG. 4A　　　　　　　FIG. 4B

STATE-DEPENDENT ENTITY BASED IMPLEMENTATION OF A SERVICE ORIENTED ARCHITECTED APPLICATION

BACKGROUND OF THE INVENTION

1. Field of the Invention

The present invention relates to the field of commerce systems and more particularly to the field of service oriented architected applications.

2. Description of the Related Art

As businesses and consumers become further interconnected through computer communications networks such as the global Internet and local intranets, the commerce sites and companion computing applications which integrate interactions between businesses and consumers alike are becoming ever more complex. Addressing the explosion of business to business and business to consumer interactions on-line, information technologists increasingly focus on architecting and implementing complete commerce site solutions to reflect the entire life cycle of a business in lieu of integrating multiple, disparate applications which when combined reflect the business life cycle. Consequently, as modern commerce sites can be both large and distributed, commerce systems have been configured to deploy complete e-commerce systems in as seamless a fashion as possible.

It is now a common trend that traditional, stand-alone, commerce oriented applications are produced from one or more components which can be individually re-used to create business processes for different solutions. Each of these components can expose itself as a set of reusable business functions, also referred to as "services" comporting with computing standards for deploying enterprise level logic that facilitate an open service oriented architecture (SOA). An SOA essentially can be defined as a system where all exposed business and technical functions are in the form of reusable services. These reusable services can communicate with each other to engage either in simple data passing between two or more services, or in activity coordination by two or more services.

In a SOA, a client can invoke an operation on a service to perform a function and, optionally the client can receive a response. Invoked services are generally business functions configured to fulfill the needs of business customers, whether those customers are individual consumers or other businesses. The functions can be grouped into various services where each service can specialize in functions such as catalog management, shopping cart management, credit card transaction processing, sales tax computation and the like. By utilizing an SOA, services in a commerce solution can interoperate with other business processes in a larger commerce solution involving one or more separate business entities and one or more separate consumer entities.

As a distributed system, an SOA suffers from the processing and resource constraints associated with data transfer granularity. Data transfer granularity refers to the size and quantity of discrete units of data communicated between the services of an SOA. During the design phase of an SOA service, the service author must ensure that the data input/output through the service interface meets the performance criteria for the service. Higher levels of granularity can provide the requisite flexibility in data manipulation within a service component—but only at a cost in that moving a volume of granular data elements from service to service can consume significant overhead. A traditional trade-off is either to have a small number of operations which transfer large amounts of data or a larger number of operations which transfer smaller amounts of data.

BRIEF SUMMARY OF THE INVENTION

Embodiments of the present invention address deficiencies of the art in respect to data granularity for an SOA and provide a novel and non-obvious method, system and computer program product for implementing an SOA using state-dependent entities. In an embodiment of the invention, a method for varying data granularity of a service component in an SOA according to state dependent entities can be provided. The method can include managing different states for a service component responsive to different operations performed in the service component; constraining an entity graph for the service component according to a first state of the service component; and, re-constraining the entity graph to include different properties for a second state of the service component.

In an aspect of the embodiment, the method further can include providing a constrained form of the entity graph to a subscribing process through a message transmitted from the service component to the subscribing process. As it is well known in the art, an entity graph is a graph of data elements that represent a business entity. In another aspect of the embodiment, the method further can include exposing an interface to the different operations. In yet a further aspect of the embodiment, the method further can include loading a state table correlating different states to different entity graph constraints, and determining a constrained form of the entity graph for each different state by reference to the state table. Finally, the instantiating, mapping, selecting and accessing can be performed based upon design artifacts such as software models of state machines. The performance can be automated at design time within an integrated development environment or software modeling environment, or dynamically by logic executing within an application server.

In another embodiment of the invention, a services component implemented for deployment to an SOA environment can be provided. The services component can include an encapsulated operation, an interface to the operation, an entity graph for the component, a state machine accounting or different states of the component, and a state table indicating different levels of availability for different data elements in the entity graph. Optionally, a database of data elements of the entity graph can be provided and can be persisted in a database or other storage medium; in such a case the service component is responsible for the management of this persistent form. As such, one or more entity enterprise Java beans (EJBs) can be provided, each coupled to the database of data elements. Each of the EJBs can map to a different constrained form of the entity graph, and a service map can map individual ones of the EJBs to corresponding different constrained forms of the entity graph. Each Entity Bean therefore presents a particular view of the entity in a given state of that entity.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 3 is a flow chart illustrating a process for deploying an SOA service component configured for variable data granularity according to state dependent entities;

FIG. 4A is a pictorial illustration of an SOA service component configured for variable data granularity according to state dependent entities; and, FIG. 4B is a pictorial illustration of an exemplary implementation of an SOA service component configured for variable data granularity according to state dependent entities.

DETAILED DESCRIPTION OF THE INVENTION

Embodiments of the present invention provide a method, system and computer program product for implementing an SOA incorporating variable data granularity according to state dependent entities. In accordance with an embodiment of the present invention, a component service in an SOA environment can manage multiple possible states for the component service. An entity graph can be maintained for information within the component service, such that once a state has been established for the component service, only the data implicated by the state in the data graph can be provided in communication with subscribers of the component service. Specifically, the data graph can be constrained to include only content specified for the state. In this way, an optimal granularity of component data can be established variably for the component service in the SOA environment according to the state of the component.

Figure 1:
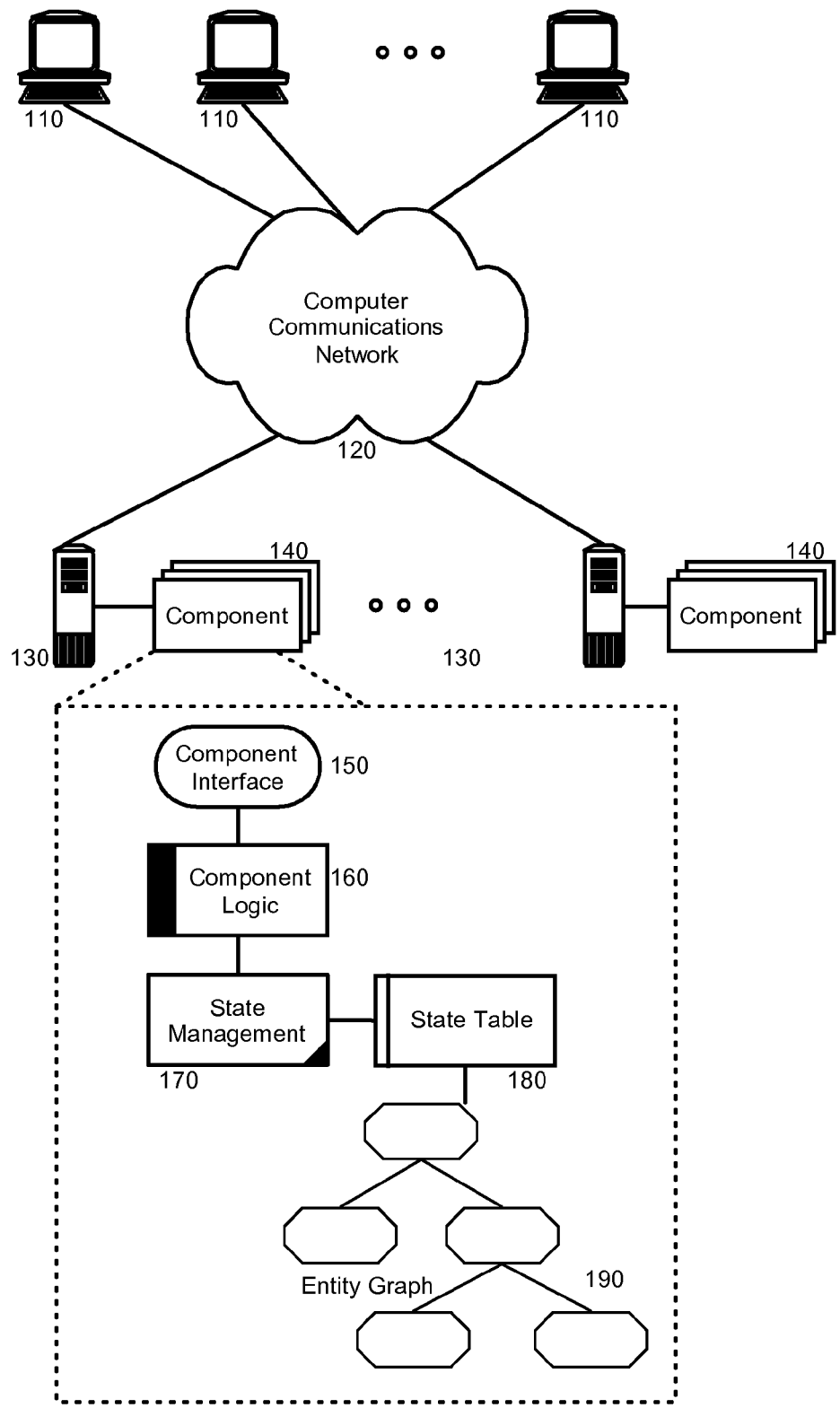
FIG. 1 is a schematic illustration of a data processing system implementing an SOA and incorporating variable data granularity according to state dependent entities.

In illustration of an exemplary embodiment of the present invention, FIG. 1 is a schematic illustration of a data processing system implementing an SOA and incorporating variable data granularity according to state dependent entities. The data processing system can include one or more host computing servers 130 hosting one or more service components 140 published for access by one or more subscribers 110 over a computer communications network 120 to form an SOA environment. Each of the components can provide component logic 160 for processing inbound messages from the subscribers 110 through a component interface 150.

Notably, the state of each of the service components 140 can be managed within the service components 140 according to state management logic 170 and a state table 180. The state table 180 can specify data elements to be included in messages provided to subscribers 110 depending upon the state of the service component 140. For example for a set of M data elements and N states, the state table can provide as follows:

| Element/State | State 1 | State 2 | ... | State N |
|---|---|---|---|---|
| Element 1 | Mandatory | Mandatory | | Optional |
| Element 2 | Optional | Not Allowed | | Not Allowed |
| ... | | | | |
| Element M | Mandatory | Optional | | Mandatory |

In this exemplary state table, different data elements can be mandatory for inclusion in certain states, optional in other states, and excluded in yet other states.

The different possible data elements described in the state table 180 can be organized and represented within the service component 140 as an entity graph 190. As the program code of the state management logic 170 transitions from state to state, the identity and arrangement of data elements to be provided to subscribers 110 within messages can change as specified by the state table 180. In this regard, the external view of the entity graph 190 can be constrained to include only a sub-set of possible data elements according to a contemporary state as specified by the state table 180.

Figure 2:
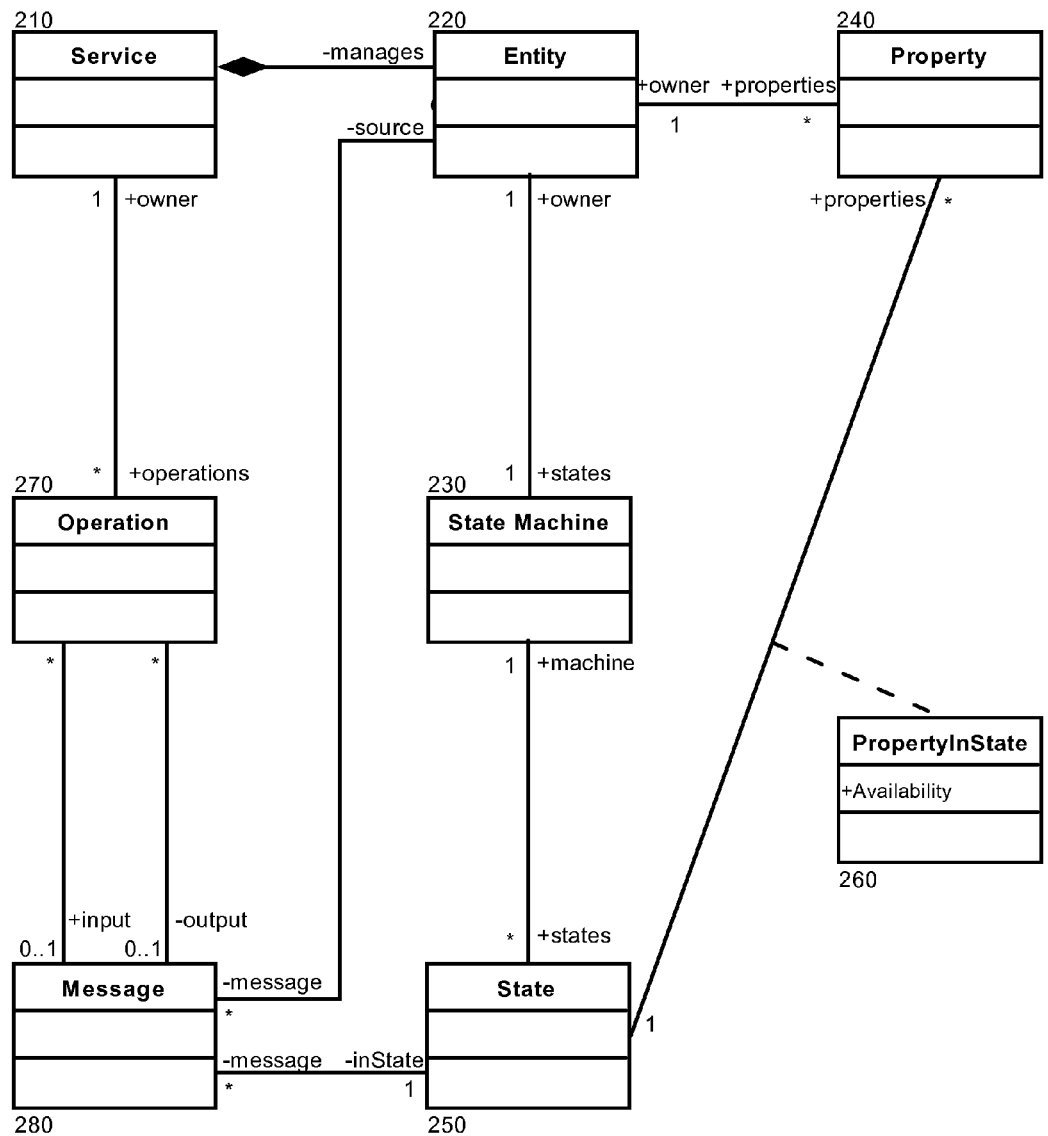
FIG. 2 is a class diagram of the structure of an SOA service component configured for variable data granularity according to state dependent entities.

In further illustration of an embodiment of the invention, FIG. 2 is a class diagram of an SOA component configured for variable data granularity according to state dependent entities. The SOA component can include a service 210 encapsulating one or more operations 270. Each of the operations 270 can be configured to process inbound and outbound messages 280. The service 210 can include an association with an entity graph 220. The entity graph 220 can include a set of data elements or properties 240. Each property 240 can encapsulate a state dependent data member 260 indicating whether the property 240 is to be included in a constrained form of the entity graph 220 to be provided in a message 280 according to a contemporary state.

In this regard, the entity graph 220 can be associated with a state machine 230 managing one or more states 250 for the service 210. The state 250, in turn, can reference a subset of the properties 240 in the entity graph 220. As such, a given message 280 to be provided through an operation 270 for the service 210 can incorporate a constrained form of the entity graph 220 according to the state 250. In this way, an optimal granularity of data from the entity graph 220 can be provided to a subscriber invoking an operation 270 in the service 210.

In yet further illustration, FIG. 3 is a flow chart illustrating a process for deploying an SOA component configured for variable data granularity according to state dependent entities. Beginning in block 310, an entity graph can be defined for a component service to include a set of data elements to be processed in the component service irrespective of state. Concurrently, in block 320, operations for the component service can be defined including different processes to be performed utilizing the data elements in the entity graph. Thereafter, in block 330 a state machine can be defined for the component service.

In block 340, content availability for the data elements in the entity graph can be determined for each state within a state table. As only one example, the content availability can range from mandatory inclusion in a constrained form of the entity graph, to exclusion from the constrained form of the entity graph. In block 350, an interface can be defined for the component service to include the operations exposed to service subscribers, a listing of data elements to be provided to the operations as input, and a listing of data elements to be provided by the operations as output. Finally, in block 360, the service component can be implemented in code and deployed into a service environment.

In even yet further illustration, FIG. 4A provides a higher level view of a service component implementation configured for variable data granularity according to state dependent entities. Specifically, as shown in FIG. 4A, a service component 410 can encapsulate an entity graph 420 that can be constrained according to state and passed in constrained form within inbound and outbound messages 440 through an interface 430 to the service component 410. One possible concrete implementation is shown in FIG. 4B, in which the different state-dependent, constrained forms of the entity graph are represented within a service 400 as entity enterprise Java beans (EJB) 450 coupled to a database 460 persisting the data elements of the entity graph. In the concrete form, a service map 470 can be provided to the different entity EJBs according to state such that the messages 490 over the interface 480 will incorporate the properly constrained form of the entity graph—this can be performed using the J2EE standard container managed persistence mechanisms.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be electronic, magnetic, optical, electromagnetic infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. In a services oriented architecture (SOA), a method for varying data granularity of a service component according to state dependent entities, the method comprising:
    managing different states for a service component of an SOA the service component executing in a host computing server, responsive to different operations performed in the service component;
    constraining an entity graph for the service component according to a first state of the service component; and,
    re-constraining the entity graph to include different properties for a second state of the service component.

2. The method of claim 1, further comprising providing a constrained form of the entity graph to a subscribing process through a message transmitted from the service component to the subscribing process.

3. The method of claim 1, further comprising exposing an interface describing the different operations.

4. The method of claim 1, further comprising:
    loading a state table correlating different states to different entity graph constraints; and,
    determining a constrained form of the entity graph for each different state by reference to the state table.

5. The method of claim 1, wherein constraining an entity graph for the service component according to a first state of the service component, comprises:
    instantiating a stateless session enterprise Java bean (EJB) for each constrained form of the entity graph;
    mapping each EJB to a corresponding constrained form of the entity graph;
    selecting an EJB corresponding to the first state; and,
    accessing a constrained form of the entity graph through the selected EJB.

6. The method of claim 5, wherein re-constraining the entity graph to include different properties for a second state of the service component, comprises:
    selecting a different EJB corresponding to the second state; and,
    accessing a re-constrained form of the entity graph through the selected EJB.

7. The method of claim 5, further comprising performing the instantiating, mapping, selecting and accessing from design artifacts comprising software models of state machines.

8. A computer program product comprising a non-transitory computer usable medium having computer usable program code for varying data granularity of a service component in a service oriented architecture (SOA) environment according to state dependent entities, the computer program product including:
    computer usable program code for managing different states for a service component of an SOA responsive to different operations performed in the service component;
    computer usable program code for constraining an entity graph for the service component according to a first state of the service component; and,
    computer usable program code for re-constraining the entity graph to include different properties for a second state of the service component.

9. The computer program product of claim 8, further comprising computer usable program code for providing a constrained form of the entity graph to a subscribing process through a message transmitted from the service component to the subscribing process.

10. The computer program product of claim 8, further comprising computer usable program code for exposing an interface describing the different operations.

11. The computer program product of claim 8, further comprising:
    computer usable program code for loading a state table correlating different states to different entity graph constraints; and, computer usable program code for determining a constrained form of the entity graph for each different state by reference to the state table.

12. The computer program product of claim 8, wherein the computer usable program code for constraining an entity graph for the service component according to a first state of the service component, comprises:

computer usable program code for instantiating a entity enterprise Java bean (EJB) for each constrained form of the entity graph;

computer usable program code for mapping each EJB to a corresponding constrained form of the entity graph;

computer usable program code for selecting an EJB corresponding to the first state; and, computer usable program code for accessing a constrained form of the entity graph through the selected EJB.

13. The computer program product of claim 12, wherein the computer usable program code for re-constraining the entity graph to include different properties for a second state of the service component, comprises:

computer usable program code for selecting a different EJB corresponding to the second state; and, computer usable program code for accessing a re-constrained form of the entity graph through the selected EJB.

14. The computer program product of claim 12, further comprising computer usable program code for performing the instantiating, mapping, selecting and accessing from design artifacts comprising software models of state machines.

* * * * *